United States Patent
Fu

(10) Patent No.: US 8,535,133 B2
(45) Date of Patent: Sep. 17, 2013

(54) VIDEO GAME WITH CONTROLLER SENSING PLAYER INAPPROPRIATE ACTIVITY

(75) Inventor: Qiang Fu, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 160 days.

(21) Appl. No.: 12/894,011

(22) Filed: Sep. 29, 2010

(65) Prior Publication Data
US 2011/0118023 A1 May 19, 2011

Related U.S. Application Data

(60) Provisional application No. 61/261,702, filed on Nov. 16, 2009.

(51) Int. Cl.
- A63F 9/24 (2006.01)
- A63F 13/00 (2006.01)
- G06F 17/00 (2006.01)
- G06F 19/00 (2011.01)

(52) U.S. Cl.
USPC ................................... 463/7; 463/37; 463/38

(58) Field of Classification Search
USPC .................................................. 463/7, 37, 38
See application file for complete search history.

(56) References Cited

U.S. PATENT DOCUMENTS

| | | | |
|---|---|---|---|
| 2002/0089422 A1* | 7/2002 | Anderson et al. | 340/540 |
| 2005/0239524 A1* | 10/2005 | Longman et al. | 463/9 |
| 2007/0197274 A1* | 8/2007 | Dugan | 463/7 |
| 2009/0312101 A1* | 12/2009 | Pope | 463/36 |
| 2010/0062833 A1* | 3/2010 | Mattice et al. | 463/24 |

* cited by examiner

Primary Examiner — William M. Brewster
(74) Attorney, Agent, or Firm — Garlick & Markison; Kevin L. Smith

(57) ABSTRACT

A video game system is operable to receive user touch location information while a first user is holding a game controller and to determine a first user ID for the first user based upon the user touch location information. Thereafter, the video game system is operable to measure an instant acceleration of the game controller, to compare the instant acceleration to a first threshold value and to lock the game controller for use by the first user corresponding to the first user ID based on the comparison of the instant acceleration and the first threshold value.

20 Claims, 13 Drawing Sheets

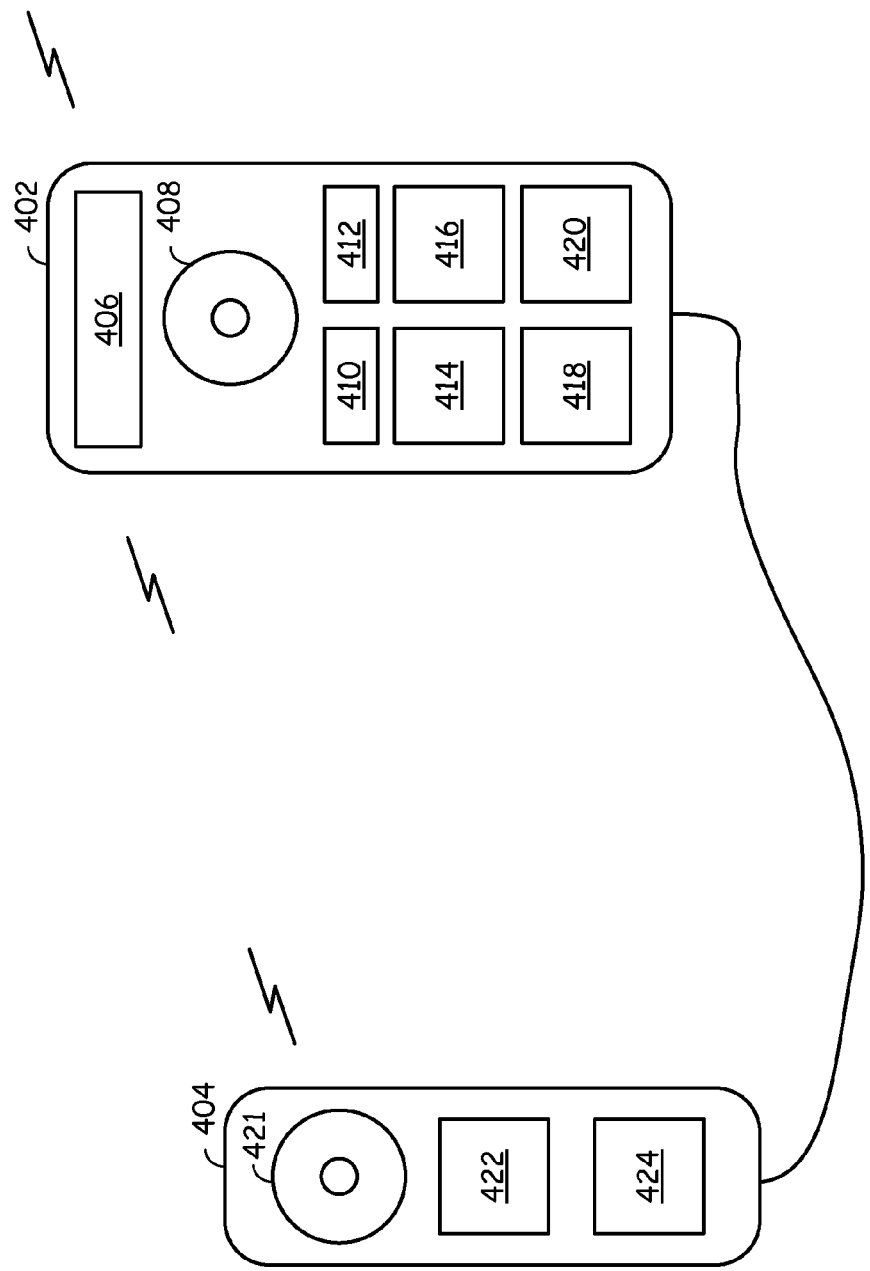

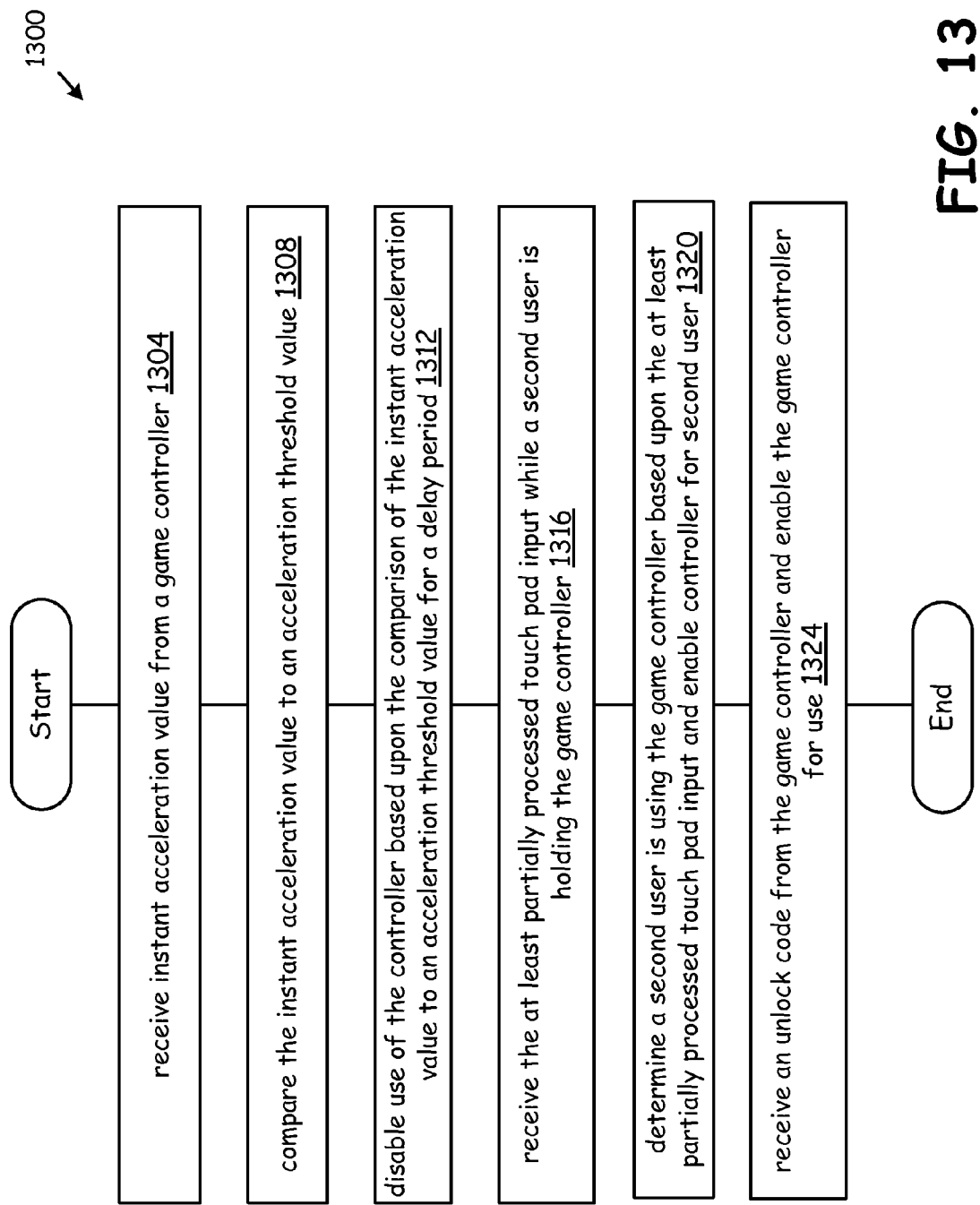

VIDEO GAME WITH CONTROLLER SENSING PLAYER INAPPROPRIATE ACTIVITY

CROSS-REFERENCE TO PRIORITY APPLICATION

The present application claims priority to U.S. Provisional Application No. 61/261,702, filed Nov. 16, 2009, which is incorporated herein in its entirety for all purposes.

BACKGROUND OF THE INVENTION

1. Field of the Invention

The present invention relates generally to electronic gaming devices; and more particularly to game controllers of video gaming devices.

2. Description of the Related Art

User gaming devices are fairly well known. These devices include game consoles with communicatively coupled controllers such as Nintendo game consoles, Sony game consoles, Microsoft game consoles, and various other game console devices. These game consoles couple to a television, may couple to an audio system, and support user game playing. Some of these game consoles support wireless communications with handheld game controllers and/or other game controllers. For example, the Nintendo Wii includes handheld controllers that detect their orientation to some degree, acceleration to some degree, and receive standard button inputs from a user. This information is wirelessly relayed to the game controller to control operation of corresponding game elements within the gaming environment. Other game controllers may include simulated game pieces such as musical instruments, baseball bats, golf clubs, and various other types of simulated devices.

With the continued advancement of technology, the complexities and capabilities of game consoles have become advanced. The game controllers support sophisticated gaming inputs received via numerous input sources, e.g., buttons, accelerometers, IR orientation detectors, positional detectors, and various other gaming inputs. The gaming environment in which these gaming inputs are received is very complex, providing a fairly realistic experience for a user of the gaming device/console. While some games supported by a game console may support only a few gaming inputs, other games require a large number of gaming inputs.

Most game consoles support many differing games, which are software controlled via respective software programming. Sometimes game controllers are specific to the particular game being supported, e.g., guitar hero, rock star, and various other particular types of games. In such a case, these various types of inputs must be supported by differing unique game controllers. The expense and complexity of the multiple game controllers can be overwhelming for some users from a cost standpoint.

Many gaming systems are contained within one unit such as the Nintendo Game Boy and its successors and the Sony Play Station and its successors, for example. These gaming systems include processing resources and a user interface contained within a single unit. With these units, various buttons receive user input while a display and speakers provide user output. Because of the limited battery life available for these units, their functionality has been limited in some regard.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

BRIEF DESCRIPTION OF THE DRAWINGS

FIG. 4 is a block diagram illustrating a game controller and coupled secondary game controller, both of which are constructed according to one or more embodiments of the present invention;

FIG. 13 is a flow chart that illustrates a method for a gaming console of a video game system according to one embodiment of the invention.

DETAILED DESCRIPTION

Figure 1:
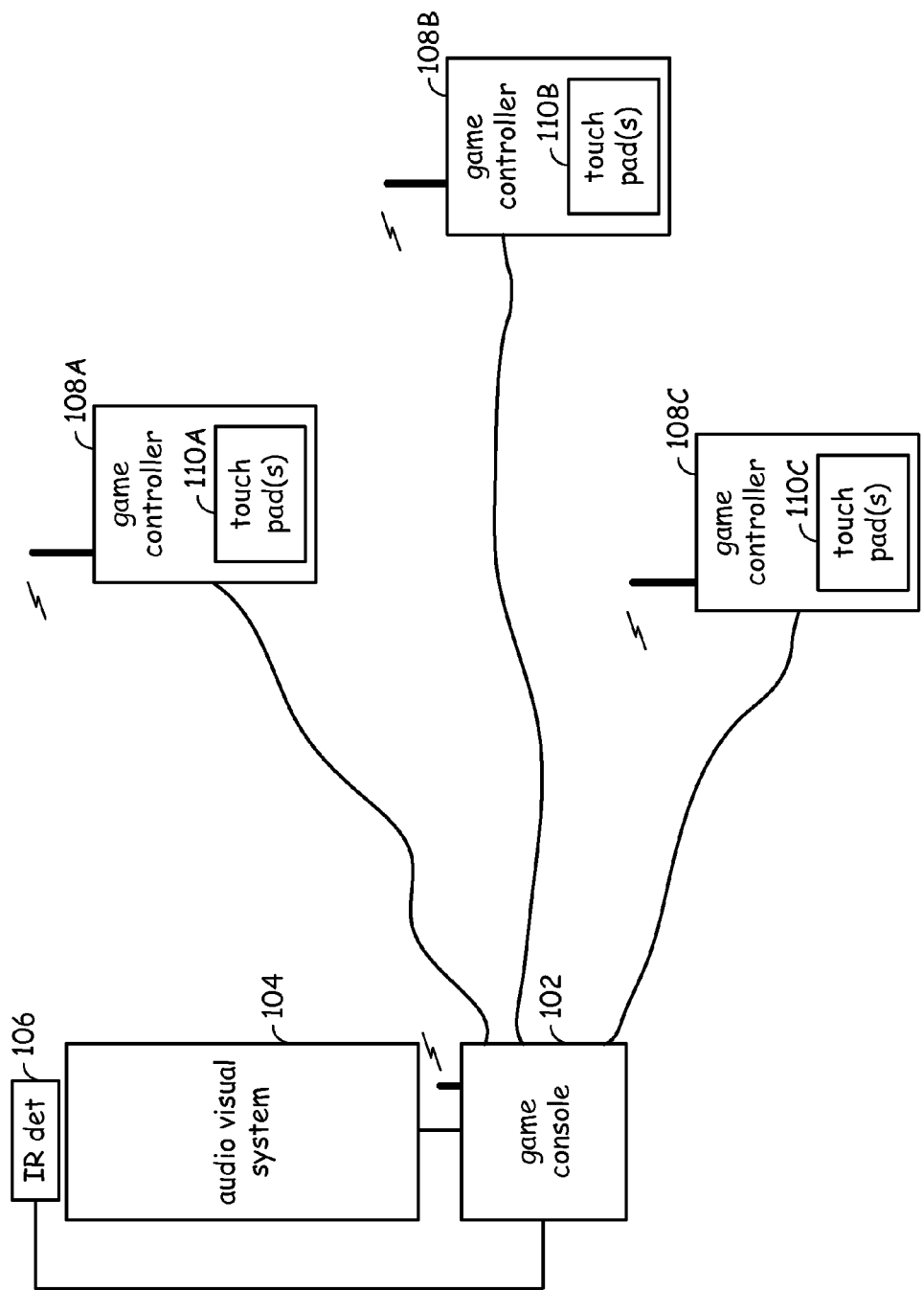
FIG. 1 is a system diagram illustrating a video game system constructed according to one or more embodiments of the present invention.

FIG. 1 is a system diagram illustrating a video game system constructed according to one or more embodiments of the present invention. The gaming system 100 of FIG. 1 includes a game console 102 and a plurality of game controllers 108A, 108B, and 108C. The game console 102 couples to an audio/visual system 104 that includes a video monitor and an audio system. The game console 102 also couples to an infrared (IR) detector 106.

The game controllers 108A, 108B, and 108C communicate with the game console 102 via one or more of a wired and/or wireless communication links. The wired communication link may be a tethered controller including conductors that support wired communications. Wireless communications may be in various RF frequency bands and/or in the infrared frequency range. Thus, each of the game controllers 108A, 108B, and 108C includes communication circuitry that allow the game controllers 108A, 108B, and 108C to communicate with the game console 102.

According to one or more embodiments of the present invention, each of game controllers 108A, 108B, and 108C includes one or more touch sensitive pads/touch pads (referred to herein interchangeably) 110A, 110B, and 110C, respectively. According to some aspect of the present invention, the touch pads of the game controllers are used to identify users of the game controllers, to provide gaming input, to determine whether a user is active, and/or to provide other information to the game console 102 for subsequent action. Data captured by the touch pads may be solely processed by a host game controller, e.g., 108A, may be partially processed and transmitted to the game console 102 for further processing, or may be transferred in an unprocessed format from the game controller 108A to the game console 102. Based upon one or more embodiments of the present invention, touch pads are coupled to touch pad circuitry that measures capacitance (inductance or RF propagation) characteristics observed by a plurality of touch sensitive elements of the touch pads. Based upon the capacitive (inductance/RF propagation) information gathered from the touch pads, a user may be identified by game console 102 and/or game controller 108A, 108B, or 108C.

According to one aspect of the present invention as will be further described with reference to the Figures, the touch pad of a particular game controller includes a plurality of touch pad elements, each of which measures a characteristic at its location, i.e., capacitance, inductance, RF propagation characteristics, a combination of these, etc. In various embodiments, capacitance, inductance, RF propagation characteristics, and/or other local characteristics to a touch sensitive element are measured over time. Based upon particular touch sensitive element characteristics as measured over time, the game controller and/or game console may identify the particular user of the game controller. The user identity may then be used to set the characteristics of the particular game being operated or supported by the game console. The manner in which a game controller 108A, 108B, and 108C and/or game console identifies a user using touch pad input is described further in co-pending application Ser. No. 12/912,458, filed on Oct. 26, 2010 and entitled "Hand-held gaming device that identifies user based upon input from touch sensitive panel".

Alternatively, the input received via the touch pads 110A, 110B, and/or 110C may be used for gaming input to the game console to modify operations of the game currently being supported by a game console to modify operation of the game currently being supported by a game console. According to another operation of the present invention, the input received via the touch pad 110A, 110B, and/or 110C may be used to replace button functionality of previous generation game controllers. In such case, the touch pads may have a back lit display that provides representations of replaced buttons. According to various other operations of the present invention, the touch pads are calibrated so as to provide accurate input and/or altered in their operation to enact improved input operations.

One aspect of the various embodiments of the invention that include such touch pads is that such touch pads may also be to identify a user in relation to determinations made within the video game system (e.g., the controller and/or the game console) to disable use of a controller for inappropriate behavior (e.g., slamming the controller against a wall or floor) and subsequently to enable use of the controller. The controller may be disabled for all usage or it may be disabled in relation to an identified user. Thereafter, either upon identification of a master user, entry of an unlock code, or expiration of a specified delay, the controller is enabled. If the controller is disabled for a specified user, then identification of a second or other user results in the controller being enabled for that second or other user. These operations may be supported solely by the game controller 108A, 108B, and/or 108C. Alternately, these operations may be supported jointly with the game console 102.

Figure 2:
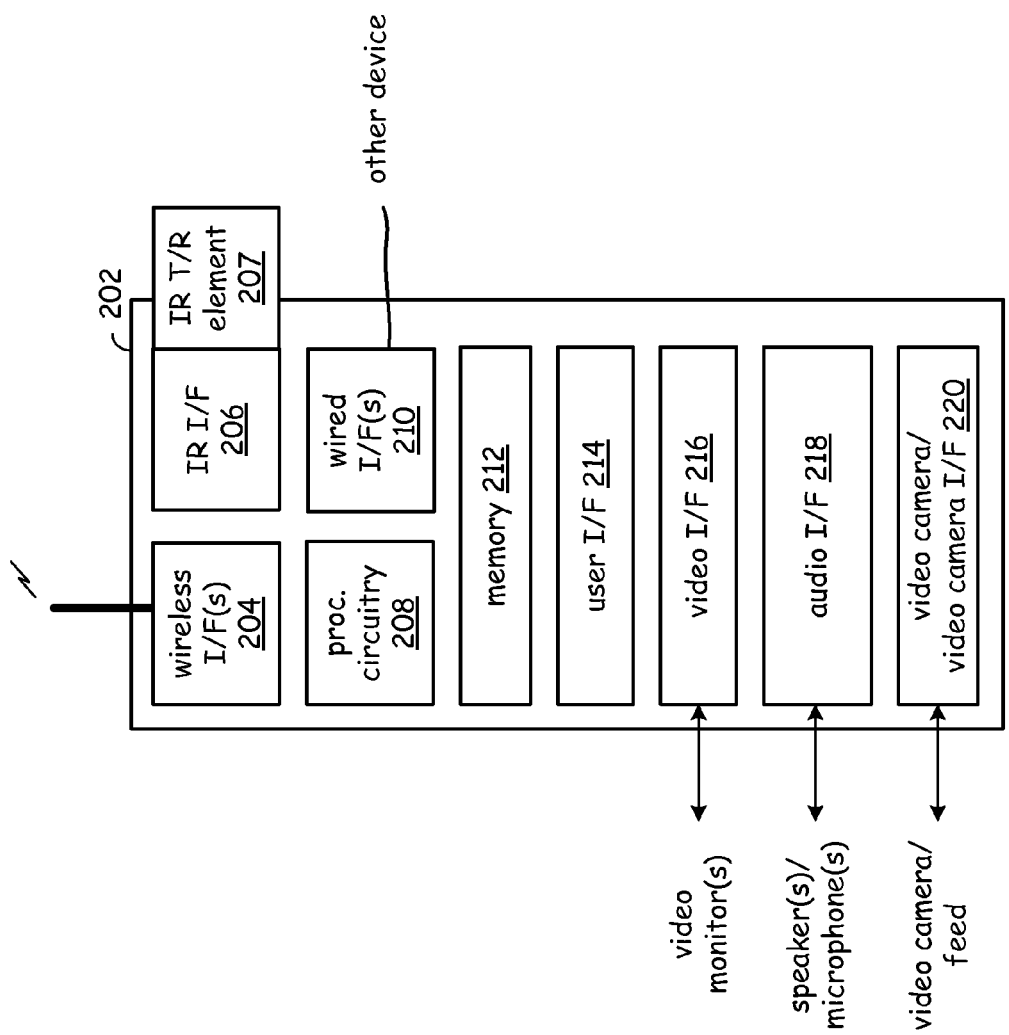
FIG. 2 is a block diagram illustrating a game console constructed according to one or more embodiments of the present invention.

FIG. 2 is a block diagram illustrating a game console constructed according to one or more embodiments of the present invention. The game console 202 of FIG. 2 includes a wireless interface(s) 204, an infrared interface 206, an IR Transmit/Receive element 207, processing circuitry 208, one or more wired interfaces 210, and memory 212. The game console 202 typically also includes a user interface 214, a video interface 216, an audio interface 218, and may include a video camera/video camera interface 220. The wireless interface(s) 204 supports wireless communications with at least the game controllers 108A, 108B, and 108C described with reference to FIG. 1. This wireless interface may be a Bluetooth interface, a wireless local area network (WLAN) interface, or another type of wireless communication interface that supports communications between the game console 202 and one or more game controllers. Further, the wireless interface 204 may support communications with a WLAN router or access point, a cellular infrastructure, a satellite communications network, or another type of wireless communications systems.

The IR interface 206 couples to the IR transmit/receive element 207 and supports IR communications with game controllers 108A, 108B, and 108C as shown in FIG. 1. The IR communications between the game console 202 and the game controllers 108A, 108B, and 108C may support an industry standard or proprietary communications protocol. The processing circuitry 208 may include one or more of a system processor, a digital signal processor, a processing module, dedicated hardware, application specific integrated circuit, or other circuitry that is capable of executing software instructions and for processing data. The memory 212 may be RAM, ROM, FLASH RAM, FLASH ROM, an optical memory, magnetic memory, or other types of memory that is capable of storing data and/or instructions in allowing processing circuitry to access same. The wired interface(s) 210 may include a USB interface, a fire wire interface, a serial interface, a parallel interface, an optical interface, or another type of interface supported by a media that is copper, metal, or optical.

The user interface 214 may include a keypad, a video display, cursor control, a touch pad, or other type of interface that allows a user to interface with the game console 202. The video interface 216 couples the game console 202 to one or more video monitors to provide display for the gaming environment supported by game console 202. The communications link between the video interface 216 and the video monitor(s) may be an HDMI interface, a composite video interface, component video interface, an S-video interface, or another type of video interface supported by both the video monitor and the game console 202. The audio interface 218 couples the game console 212 to speakers and/or microphones for audio content delivery and receipt. The video camera/video camera interface 202 may include an onboard video camera or may couple the game console 202 to an external video camera. The external video camera may be used to provide gaming input or other types of information that the game console 202 uses within its operation to produce a gaming environment.

Game console 202 is operable to receive instant acceleration information to determine whether a controller should be disabled. Game console 202 is further operable to receive at least partially processed identification information to identify the user of the controller. Finally, game console is further operable to compare the instant acceleration exceeds an acceleration threshold as a part of determining whether to disable the controller. Game console 202, if the user is known, is further operable to disable the controller in relation to the user. Further, in one embodiment, game console 202 is operable to store a plurality of acceleration thresholds in relation to at least one of a plurality of users, games, controller types, and game types.

Figure 3B:
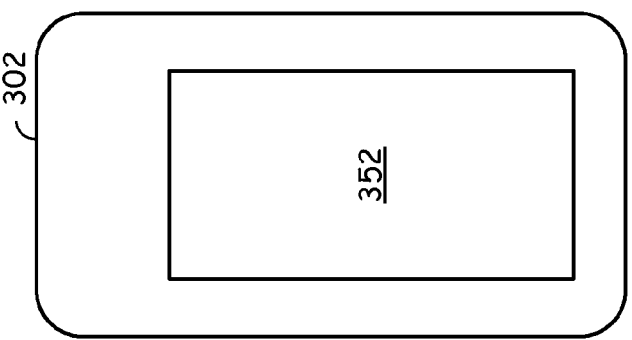
FIG. 3B is a second perspective view of the game controller of FIG. 3A that is constructed according to one or more embodiments of the present invention.
Figure 3A:
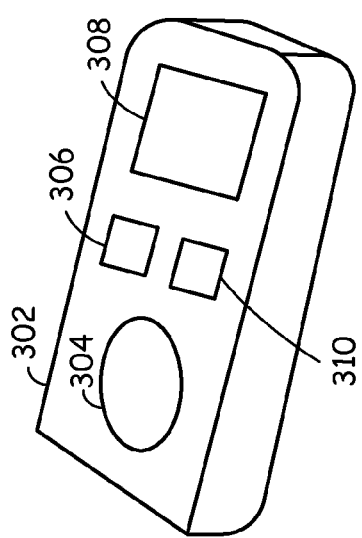
FIG. 3A is a first perspective view of a game controller constructed according to one or more embodiments of the present invention.

FIG. 3A is a first perspective view of a game controller constructed according to one or more embodiments of the present invention. As shown in FIG. 3A, a game controller 302 includes a cursor control 304, mechanical buttons 310 and 306, and may include a touch pad 308. The cursor control 304 may be a touch pad. When 304 and 308 are both touch pads, they receive inputs and may be used for user identification, gaming input, or other operations supported by the gaming system and includes game controller 302.

FIG. 3B is a second perspective view of the game controller 302 of FIG. 3A that is constructed according to one or more embodiments of the present invention. As shown in FIG. 3B, a reverse portion of the game controller 302 may include a touch pad 352. The touch pad 352 may wrap around a back portion of the game controller 302. Alternatively, the touch pad 352 may reside on a battery cover of the game controller 302. As will be described further herein, the touch pad 352 includes a plurality of touch pad locations/touch sensitive elements that receive input that may be further used for user ID, gaming input, and/or other purposes.

FIG. 4 is a block diagram illustrating a game controller and coupled secondary game controller, both of which are constructed according to one or more embodiments of the present invention. As shown in FIG. 4, primary game controller 402 includes a display 406, a circular input device 408, and button inputs 410, 412, 414, 416, 418, and 420. Any of these input devices 408, 410, 412, 414, 416, 418, and 420 of primary game controller 402 may be touch pads, as is further described herein. These touch pads receive gaming input in a manner that is consistent with mechanical counterparts that were previously implemented according to prior devices. Further these touch pads may receive input that is used to identify a user or to provide other information.

The primary game controller 402 couples to secondary game controller 404 via either a wired or a wireless interface. The secondary game controller 404 includes input components 421, 422, and 424. These input components of the secondary game controller 404 may be embodied by either mechanical input devices or touch pads. The manner in which touch pads are implemented is described further herein. Data collected from these input components 421, 422, and 424 are relayed to game controller 402, which may process the inputs. Alternately, the input received from input components 421, 422, and/or 424 may be relayed to a servicing game console.

The primary game controller 402 and the secondary game controller 404 may both be hand-held devices. Alternately, one or the other of these game controllers may be placed on the floor, inserted into a simulated gaming piece, e.g., guitar, drums, simulated golf club, simulated baseball bat, etc. Each of these game controllers 402 and 404 may capture touch pad input as is further described herein with reference to the FIGs.

The touch pad input captured by game controllers 402 and 404 may be processed to produce combined gaming input or transmitted separately to a game console 202. The combined or separate touch pad input may be used as gaming input, may be processed to identify a user, or may be processed to otherwise provide input to a supported video game.

Figure 5:
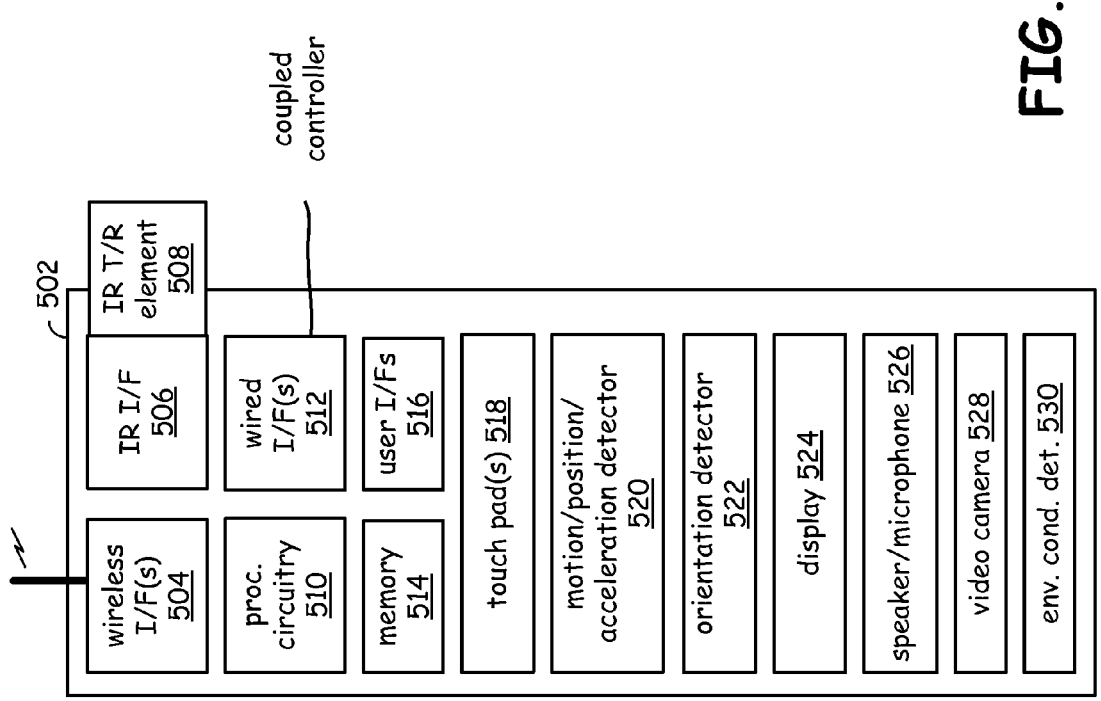
FIG. 5 is a block diagram illustrating a game controller constructed according to one or more embodiments of the present invention.

FIG. 5 is a block diagram illustrating a game controller constructed according to one or more embodiments of the present invention. The game controller 502 includes one or more wireless interfaces 504, an IR interface 506 that includes an IR transmit/receive element 508, processing circuitry 510, wired interface(s) 512, memory 514, and user interface(s) 516. These particular components of the game controller 502 may be similar to the like named components of the game console 302 illustrated in FIG. 3 and described with reference thereto. However, in other embodiments, these like named components may have differing construct/functionality, e.g., smaller memory, less processing capability, lower power wireless interfaces, etc. Thus, commonly named components will not be described further herein as they have been previously described with reference to FIG. 3.

The game controller 502 includes one or more touch pad(s) 518, motion/position/acceleration detector 520, orientation detector 522, display 524, speaker/microphone 526, and a video camera 528. The game controller may also include other components such as one or more environmental conditions detectors 530 that are used to sense environmental conditions such as temperature, humidity, and other environmental conditions. The structure and operations of the touch pads 518 will be described further herein with reference to subsequent FIGs. The motion/position/acceleration detector 520 detects motion/acceleration of the game controller 502. Detection of such motion/acceleration may be performed in conjunction with the game controller, using a GPS system, using an accelerometer or gyrator of the game controller 502 and/or using external components to determine motion/acceleration position of the game controller. The motion/position/acceleration detector 520 may also determine position of the game controller. The manner in which the motion/position/acceleration detector 520 determines the position of the game controller 502 is not described further herein. However, the position detector 520 may use external reference devices in order to determine position of the game controller within a gaming environment. Motion, acceleration, and position of the game controller 502 may be provided to a servicing game console as a gaming input.

The orientation detector 522 determines an orientation and/or direction in which the game controller is pointed. Such orientation detection provided by orientation detector 522 may be accomplished in conjunction with the IR interface 506 of the game controller 502. Such orientation detection may be performed in conjunction with the IR detector 106 of the gaming system 100 of FIG. 1.

The display 524 of the game controller 502 may have a relatively small size or relatively large size that presents information to a user and that allows the user to respond accordingly. The speaker/microphone 526 may receive audio input and provide audio output to a user of the game controller 502. Audio input captured by the microphone may be used in conjunction with touch pad 518 input for user identification and/or for gaming input. Video camera 528 of the game controller may be used to determine a location of the game controller and/or may be used to provide additional gaming input for gaming environments supported by the game controller 502.

According to one particular aspect of the gaming system of FIG. 1, the touch pad(s) 518 of the game controller 502

(and/or game console) may be capacitive, inductive, or RF based. With regard to inputs received via the touch pad of the game controller, the raw data received by a touch pad of the game controller may be fully communicated to the game console of the gaming system. Alternatively, information captured via the touch pad(s) 518 of the game controller may be processed by the processing circuitry 510 of the game controller 502 (or other processing circuitry such as the touch pad circuitry shown in FIG. 6, which may be different or the same as the processing circuitry 510) prior to communicating such information to the game console 102 of FIG. 1. Such processing may be full or partial to determine whether and what data to upload to the game console.

Referring again to FIG. 4, the touch pad input received by game controller may be received at both primary 402 and secondary 404 game controllers of FIG. 4. The input received from multiple touch pads of the primary and secondary game controllers 402 and 404 may be received and at least partially processed by processing circuitry of the game controller(s) prior to uploading the data to a game console. The basis for touch pad input processing may be based upon a current usage of the game controllers. For example, the primary game controller 402 may be relevant to a first portion of a user's body while the secondary game controller 404 may be relevant to a second portion of a user's body. In one particular example, teachings of the present invention apply touch pad operations to an input device that receives data corresponding to one or more feet of a user, e.g., secondary controller 404 is a foot pad. In such case, a foot pattern of a user may be employed to identify the user or to receive gaming input from the user within the gaming system.

The data received from one or more touch pads according to the present invention may be used to identify a user of the gaming system. Data captured by one or more touch sensitive pads or panels is used to distinguish a user from a plurality of users based upon finger width, finger length, finger spacing, knuckle joint location, finger angle, and other characteristics of a user's hand/fingers that is used to grasp the game controller. Identification of the user is done based upon pattern matching using various techniques, some of which are known. Further, the touch pad and related operations supported by the structures of the present invention may identify users based upon the heat transfer characteristics, their pulse rate characteristics, and other characteristics that would be gathered via input at a touch pad.

In establishing user characteristic/user ID correspondence, there may be multiple levels of training. With one level of training, a user sets-up his or her identity within the gaming system. Then, a first operation establishes correspondence between touch pad characteristics and the user. The gaming system may query a user to confirm that he or she is currently using the game controller with this operation by receiving input from a touch pad and then confirming that the particular user identity is correct. Further, the training may proceed so that it is initially intrusive and asks a number of questions of the user but then decreases its intrusions when matching stored users with touch pad input characteristics.

Alternatively, the game controller may simply automatically relate user characteristics as received from a touch pad with game characteristics or settings of the gaming system. Generally, the user identification learning process should be as automatic as possible so as not to be burdensome to users of the system. Further, the user identification system of the present invention should delete inactive users from the database so that they are not considered as candidates when determining whether or not a current user is one of a plurality of registered or prior users of a system.

According to another aspect of the present invention, the touch pad input that is used to identify the user may be used in conjunction with auxiliary information to identify a particular user. This auxiliary information may include game usage levels, game selections, time of day at which game is performed, day of week at which game is performed, gyrator input (accelerometer input), coupled secondary gaming devices or service devices, and/or additional auxiliary information. For example, one particular user may select generally games A, B and C while another user may select generally games C, D, and E. Based upon a particular game selection and data input received from a touch pad, the auxiliary information of game selection may be used to further identify the user that is currently using the gaming system. Moreover, a particular user may only use the system during certain times of the day or days of the week and such information is further used to determine identity of the user of the gaming system. Moreover, some users may only use certain auxiliary devices such as nun chucks, guitars, drums, car driving accessories, plane control accessories, or other coupled devices of the game controllers. In such case, the operations of the present invention may use the fact that these devices are coupled to further limit the number of potential users that are considered for identification at a particular time.

Once a user is identified, a user ID is employed to enact a user's custom game data or settings for the gaming system. For example, a particular user is identified and this user's game selection, game settings, and other preferences that have been previously inputted into the game system are automatically enacted. According to another aspect of the present invention, once a user is identified, the gaming environment settings are altered based upon such identification. For example, once the user is identified, the game difficulty level, game entry point, game controller button functions, game controller touch sensitive panel/touch pad gaming input functions, and/or other custom settings of the gaming system may be altered. In one particular example, once a user is identified, a sequence of touches on the touch pad may alter some game operation or game selection operations. These particular custom operations are based upon the fact that a particular user is identified as currently operating the gaming system. Further, menus and other user input selections may be altered after a user is identified. For example, the user may have previously indicated that he or she only wants to employ certain games. Once that user is identified then the gaming system would only give that particular user the option of selecting from a list of previously selected games. Further, the user may have customized the menu of the gaming system previously. When the user identified them the customized user interface of the gaming system is enacted.

According to another aspect of the present invention, input received via touch sensitive pads or panels may be used for gaming input. For example, the touch pads may be used to determine that a user has changed his or her hand or finger positions, changed his or her grip positions or otherwise abruptly changed an input to a game controller that is used within a gaming system. Such detection may be used with one scanning rate of the touch pad. Alternatively, the scanning rate of the touch pad may be altered based upon a game being played. For example, when the game being played is one that has minimal input requirements the scanning rate may be relatively lower. However, when a game is being played that has a relatively higher input rate such as a fitness program, the scanning rate of one or more touch pads of one or more game controllers may be increased. Further, scanning of one or more of the touch pads may be enabled for some portions of the game while not enabled for another portion of the game.

For example, grip/finger position movement or pressure changes may be enabled during a first portion of the game and not enabled for other portions of the game. Such is the case because the particular gaming input that is being sensed by changing finger position or grip pressure is only relevant during some portions of the game and not others.

The gaming input may be based upon a change from a prior hand position or a prior relationship between the hand and the game controller and a current position of the hand with respect to the game controller. For example also, a baseline position for the hand with respect to the game controller may be established during a baseline mode of operation. Then, any alteration of the position of the hand with respect to the game controller will serve as a differing gaming input while operation of the game progresses.

Further, each particular game may have its own particular touch input language that implements particular game function(s). Such game touch input language may be considered as a sequence of touches with the touches in particular portions of the touch pad providing input to the game. The sequence of touches provided to the touch pad is similar to those that may be provided via sequence of button selections via mechanical buttons of the prior game controller. However, because the touch pad of the present invention game controller is very configurable and not limited by mechanical button limitations, the touch pad may be configured at different points in time to have particular touch sequence input functions.

According to operations of the game controller 502 as further described herein, the processing circuitry 510 detects an instant acceleration of the game control 502 via the motion/position/acceleration detector 520. The processing circuitry 510 compares the instant acceleration of the game control 502 to one or more acceleration thresholds. Upon an unfavorable comparison, the processing circuitry disables the game control 502, i.e., interrupts use of the game control 502 for gaming input and/or other input. The game control 502 then waits for satisfaction of an operating condition to reestablish operation of the game controller 502. Such condition may be expiration of a timer, receipt of an unlock code, acceptable acceleration for a time period, etc. Once the condition is met, the operation of the game control 502 is reestablished.

For example, a child using the game controller 502 may throw the game controller to the floor. When this occurs, the game controller 502 disables itself in an attempt to preclude recurrence of this behavior. Parent input of a code may be required to unlock the game control 502. Alternately, after a delay period, the game controller 502 enables its full functionality.

Figure 6:
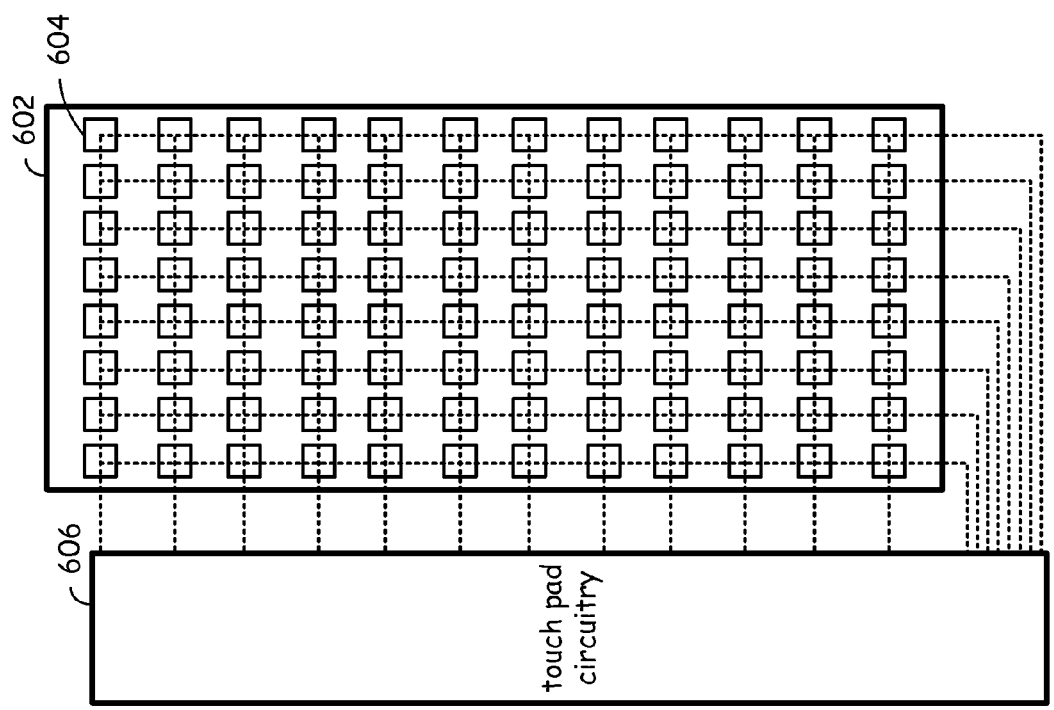
FIG. 6 is a block diagram illustrating a touch sensitive pad and touch pad circuitry constructed according to one or more embodiments of the present invention.

FIG. 6 is a block diagram illustrating a touch sensitive pad and touch pad circuitry constructed according to one or more embodiments of the present invention. A touch pad 602 includes a plurality of touch sensitive elements 604 each of which corresponds to a particular location of the touch pad 602. With the embodiment of FIG. 6, the touch pad includes an array of touch sensitive elements 604, each of which may be a particular capacitively coupled location, inductively coupled location, or a radio frequency (RF) touch sensitive element. Touch pad circuitry 606 couples via a grid structure to the plurality of touch sensitive elements 604 to sense the particular capacitance, inductive, or RF characteristics at each of the touch sensitive elements.

Touch pad circuitry 606 scans the plurality of touch sensitive elements 604 via access of particular row-column combinations at particular times. The frequency or voltage at which the touch pad circuitry 606 scans the plurality of touch sensitive elements 604 may be altered over time. Choosing the scanning frequency or scanning voltage may be based upon a particular operational use of the touch pad. For example, at some points in time the manner in which the touch pad is scanned will change based upon a particular point in a game of a gaming system with which the touch pad functions as gaming input device. Further, a first scanning frequency/scanning voltage may be employed for user identification while a second scanning frequency/scanning voltage may be employed for gaming input functions.

Further, the scanning done by the touch pad circuitry 606 of the plurality of touch sensitive elements may be made using a spread spectrum scanned frequency technique. Such technique may be employed to more efficiently capture information from the touch pad 602 at the various touch sensitive elements 604 or to determine which particular scanning frequencies are more successful than others in capturing input information.

Further, the scanning of each row and column corresponding to a particular touch sensitive element 604 may be altered based upon a detected capacitance (inductance/RF propagation) at the location. For example, one particular touch sensitive element 604 may have a fixed capacitance that does not vary over time. Such fixed capacitance may indicate that the particular touch sensitive element 604 is inoperable or that it receives no discernable input. In such case, by not scanning the particular touch sensitive element, other touch sensitive elements may be more frequently scanned or energy may be saved by not scanning all touch sensitive elements.

According to another aspect of the present invention, some portions of the touch pad may be disabled while others are enabled at differing points in time. Enablement of some touch sensitive elements and not others may be based upon a custom configuration of the touch pad for a particular input function provided.

The touch pad 602 may also be calibrated by the touch pad circuitry 606 based upon the environmental factors such as temperature, humidity, and surrounding noise from the capacitance, inductance, or RF perspective. Calibration of the touch pad 602 allows the touch pad 602 to have more efficient and effective touch pad input for user identification and/or for other input purposes.

Further, the calibration of the touch pad 602 by the touch pad circuitry 606 may be initiated at particular points in time. The touch pad circuitry 606 may simply initiate calibration of the touch pad 602 upon the expiration of the timer such that the touch pad is calibrated at a particular regular time interval. Alternatively, the touch pad 602 may be calibrated after a period of inactivity so that the touch pad circuitry 606 may determine that no input is present on the touch pad 602. With other operations or embodiments, the touch pad 602 may be calibrated by the touch pad circuitry 606 using other input criteria as well.

Figure 7:
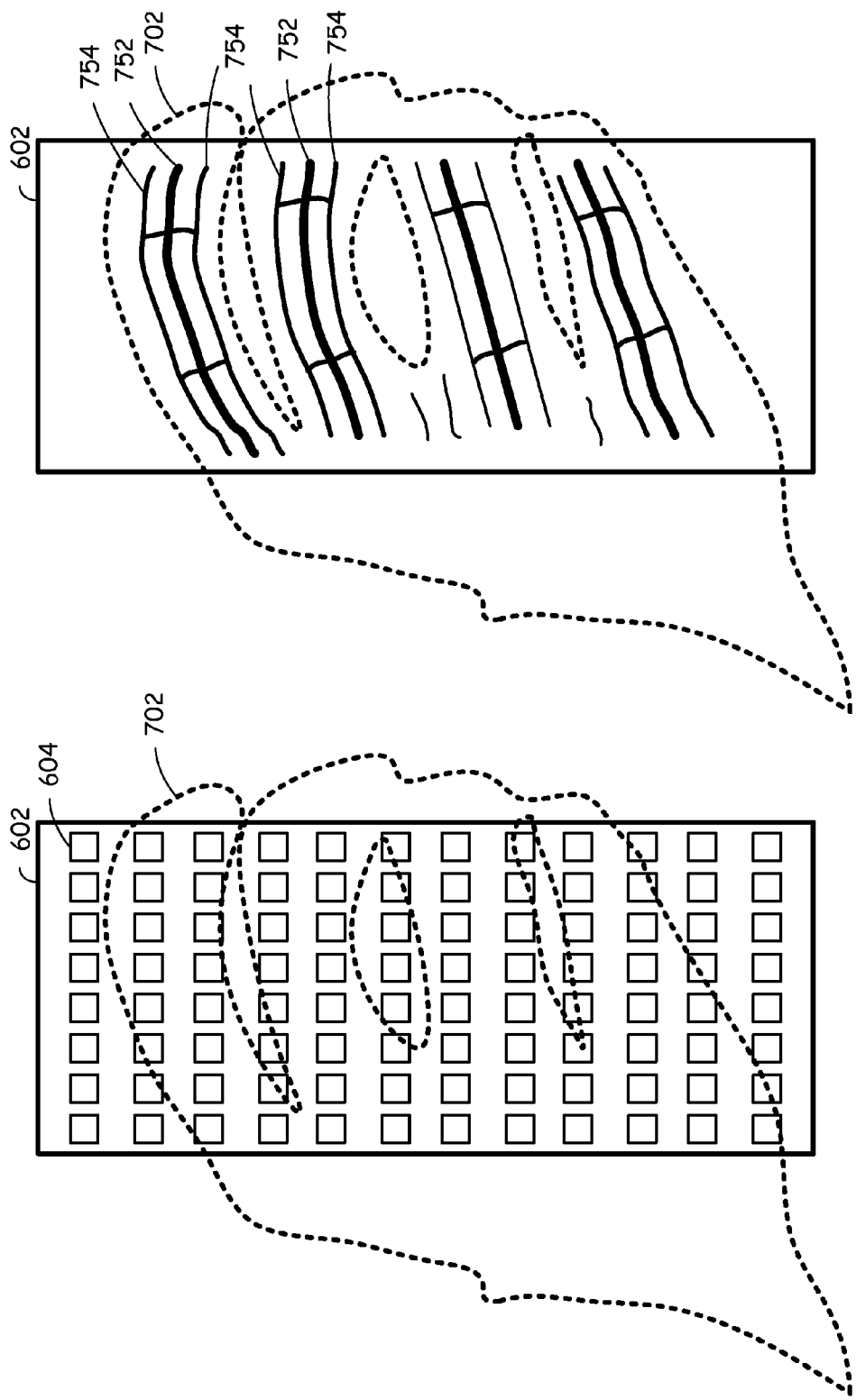
FIG. 7A is a diagram illustrating how a user's hand may overlay a touch sensitive pad according to one or more embodiments of the present invention.
FIG. 7B is a diagram illustrating the manner in which a user's hand upon the touch sensitive pad and may produce a particular pattern of capacitance upon the touch sensitive pad.

FIG. 7A is a diagram illustrating how a user's hand may overlay a touch sensitive pad according to one or more embodiments of the present invention. The touch pad 602 has a plurality of touch sensitive elements 604 and is mounted upon a game controller, remote control or other device so that it is adjacent a user's hand when the user holds the device. The outline 702 of users hand is shown as overlaying the touch pad 602 and the plurality of touch sensitive elements/touch pad locations 604.

FIG. 7B is a diagram illustrating the manner in which a user's hand upon the touch sensitive pad and may produce a particular pattern of capacitance upon the touch sensitive pad. A relative capacitance, inductance, or RF propagation pattern of the user's hand 702 is shown on touch pad 602. The depiction in FIG. 7B is illustrated in general only of relative capacitance at each of the user's finger location positions upon the touch pad 602. For example, where the user's fingers touch physically the touch pad 602, stronger capacitance lines 752 and 754 are shown. Where the user's fingers overlay the touch pad 602, lesser capacitance, inductance, or RF propagation characteristic lines 754 are shown. While other capacitance lines on the touch pad 602 are not shown in FIG. 7B as numbered, the various capacitance lines would be present for the other fingers as well.

The capacitance pattern of the user's hand 702 upon the touch pad 602 is a signature of a particular user. The size of user's hands, the positions of their knuckles, the relative angle at which they grip the controller via a game controller or a remote control device, for example, will vary from user to user. Thus, based upon this variation of the capacitive pattern upon the touch screen 602, differing users can be identified. Further, considering that the touch pad 602 may serve as a gaming or other input device, the capacitance of the touch sensitive elements 604 of the touch pad of 602 over time as it varies may be used to indicate touch pad input. Based upon the scanning frequency, the scanning voltage, and other scanning factors of the touch pad 602 at the various touch sensitive elements 604, the characteristics measured at each touch sensitive element 604 over time will enable the device to identify a user or to try particular input via the touch pad 602.

The apparatus of FIGS. 1-6 can singularly or jointly perform the operations of the following FIGS. 8-15. With some of these FIGs. processing performed is not identified as being performed by a particular device. In such case the processing may be performed by one or both of a game controller and/or a game console. In other operations the processing or operations performed are attributed to one of a game console or game controller. In such cases, the processing could alternatively be performed by the other of the game console or game controller or jointly by the game console and game controller.

Figure 8:
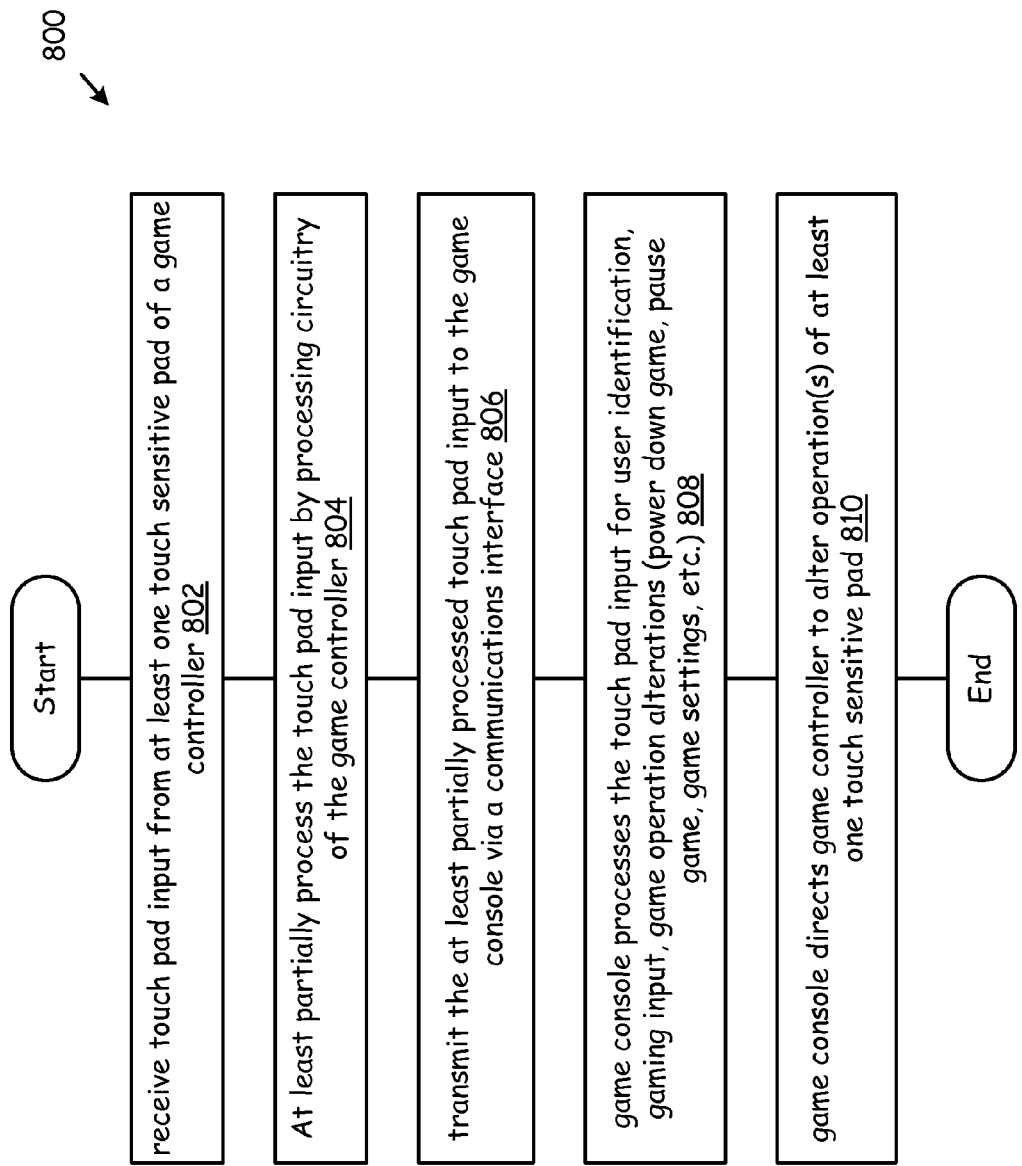
FIG. 8 is a flowchart illustrating operations of a game controller and a game console to receive and process touch pad input according to one or more embodiments of the present invention.

FIG. 8 is a flowchart illustrating operations 800 of a game controller and a game console to receive and process touch pad input according to one or more embodiments of the present invention. In FIG. 8, operations 800 begin when touch pad input is received from at least one touch sensitive pad of a game controller, step 802. As previously shown, the at least one touch sensitive pad of a game controller has a plurality of touch sensitive elements. Each of these touch sensitive elements is individually scanned to detect capacitance, inductance, or RF propagation characteristics of the touch sensitive element.

The touch pad input corresponds to a user's touch of at least some of the plurality of touch sensitive elements. The touch pad input is processed by processing circuitry of the game controller, step 804. The game controller may perform first processing operations on the touch pad input and transmit the touch pad input to the game console for second processing operations such that processing operations on the touch pad input are shared between the game controller and the game console. Alternately the game controller may simply transmit raw touch pad input to the game console for processing. In still other operations, all processing of the touch pad input is performed by the game controller.

The at least partially processed touch pad input is transmitted to the game console via a communications interface of the game controller, step 806. The game console processes the touch pad input for user identification, gaming input, game operation alterations (e.g. power down game, pause game, game settings, and the like), step 808. The game console may then direct the game controller to alter its operations at step 810, including altering operations of the touch sensitive pad.

Figure 9:
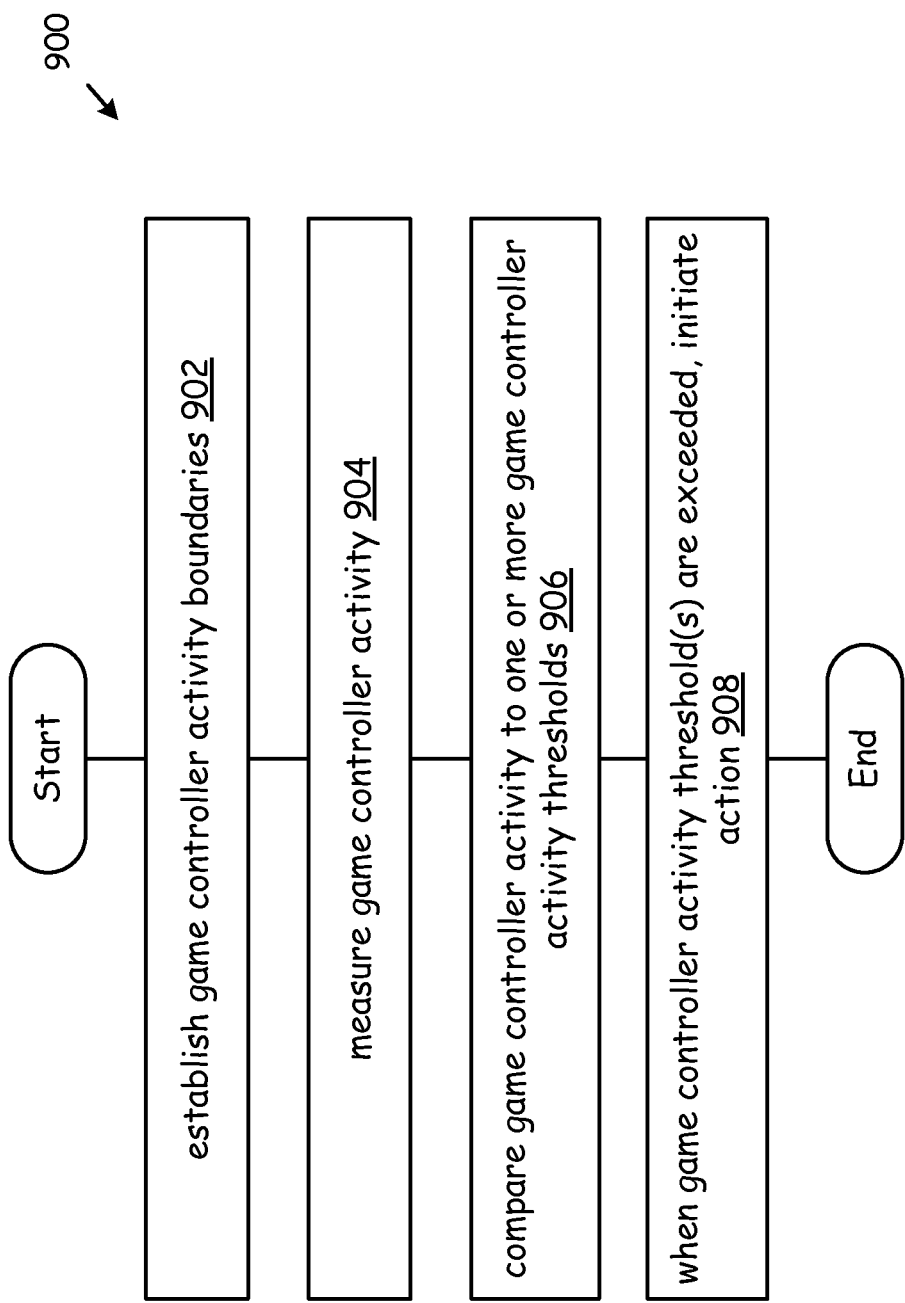
FIG. 9 is a flowchart illustrating a method for detective inappropriate usage of a game controller according to one or more embodiments of the present invention.

FIG. 9 is a flowchart illustrating a method for detective inappropriate usage of a game controller according to one or more embodiments of the present invention. The operations 900 of FIG. 9 are initiated to determine when inappropriate activity or usage of a game controller has occurred. Thus, the first steps of the operations 900 include establishing a game controller activity boundaries baseline, Step 902. For example, the boundaries or baseline for a game controller during one type of video game may be different than another type of video game in which the game controller is much more active in its motion. Further, when applying the principles of the operations 900 of FIG. 9 to a remote control, the remote control may have a single activity boundary. Establishing the activity boundaries of step 902 may be based upon the user ID as well. In all cases, the game controller and/or game console selects an acceleration threshold.

Then, operations 900 continue with measuring game control or activity, e.g., the instant acceleration of the game controller, Step 904. Game controller activity may be measured by the motion of the game controller via position determination circuitry, acceleration circuitry, orientation circuitry, or other means that indicate not only that the game controller or remote control is being used by user but in what fashion.

Then, the game controller and/or game console compare(s) the game controller activity to one or more game controller activity acceleration thresholds, e.g., compare the instant acceleration of the game controller to one or more acceleration threshold values, Step 906. Then, when one or more game controller activity acceleration threshold is exceeded, the operation 900 includes initiating an action item or an action set of operations, Step 908. In one example of the operation of step 908, the operation of the game controller is disabled for gaming operations and/or for other use.

For example, the operations 900 of FIG. 9 may determine if the game controller has been thrown from the floor due to significant acceleration change of the game controller. In such case, determination may be made that the game controller having been thrown should be shut down for a period of time to prevent inappropriate activity that may further occur. Such activity may occur when a user loses his or her temper and throws the controller onto the floor or the wall. In such case, the activity may institute a disablement of the controller for a period of time to ensure that it will not be damaged. As another example of the operations 900 of FIG. 9, the game controller and/or game console is able to determine when the device has become non-active through lack of input. In such case, the game controller may put itself to sleep so as not to drain battery life.

Figure 10:
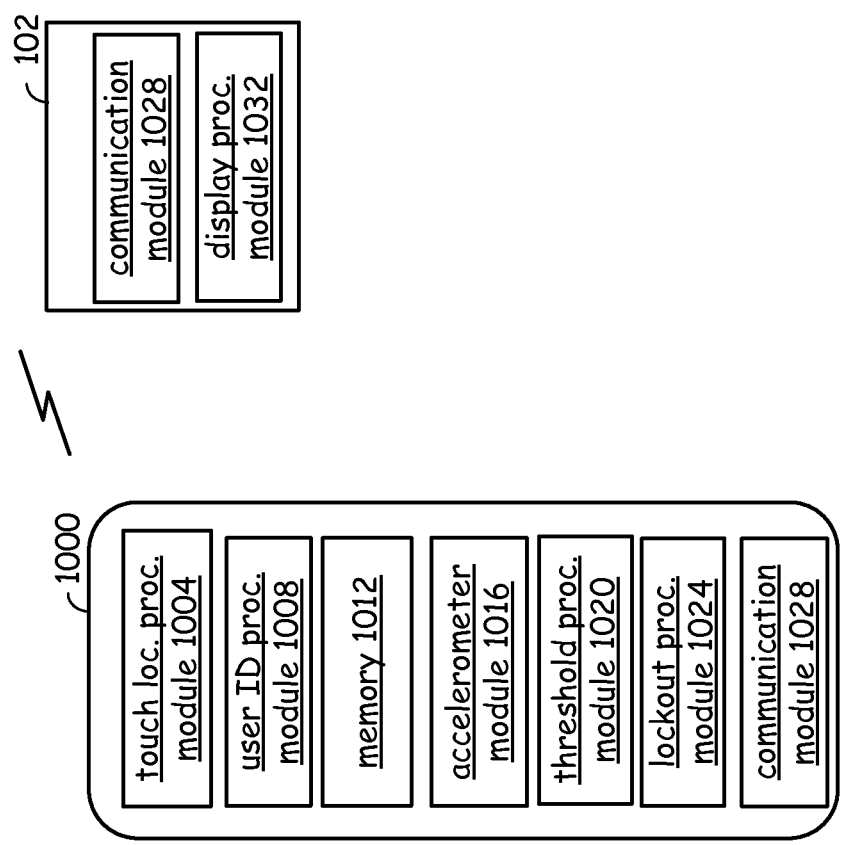
FIG. 10 is a functional block diagram of a video game system for detecting inappropriate behavior according to one embodiment of the invention.

FIG. 10 is a functional block diagram of a video game system for detecting inappropriate behavior according to one embodiment of the invention. A video game system as shown in FIG. 10 includes a controller 1000 that communicates with a game console 102. Controller 1000 includes a touch pad on an outer surface and associated touch identification circuitry of controller 1000 that generates touch location information. The touch pad and associated touch identification circuitry is not shown here but is shown in relation to prior figures including, for example, FIG. 6. The game controller 1000 shown here in FIG. 10 includes touch location processing module 1004 for generating user touch pad information, e.g., touch location information, while a first user is holding a game controller and user ID module 1008 for determining a first (and/or a second) user ID for the first (and/or second) user based upon the user touch pad information. A memory 1012 includes a data element that correlates touch data with user ID for a plurality of users having corresponding user IDs.

Accordingly, when a user holds a game controller 1000, logic 1008 receives touch information generated by circuitry 1004 and evaluates the received touch information in relation to touch data stored within memory 1012 to determine a user ID.

Game controller 1000 further includes accelerometer module 1016 for measuring an instant acceleration of the game controller. The accelerometer module 1016 may be a part of or separate from motion/position/acceleration detector 520 of FIG. 5. The accelerometer module 1016 generates acceleration information that identifies acceleration rates of the game controller 1000. In one embodiment, accelerometer module 1016 generates acceleration information continuously while the game controller is being used in a game. In another embodiment, accelerometer module 1016 generates acceleration information only when the acceleration information exceeds an acceleration threshold value.

Game controller 1000 also includes threshold processing module 1020 for comparing the instant acceleration to an acceleration threshold value that is stored within memory 1012 and lockout processing module 1024 for determining that the game controller should be disabled or locked for use when the instant acceleration exceeds the acceleration threshold value. In one embodiment, lockout processing module 1024 disables the game controller for a specified amount of time (delay period). Thus, controller 1000 enables the game controller for use after a specified amount of time has elapsed since the game controller was locked.

In another embodiment, lockout processing module 1024 disables the game controller for use by a first user (the user holding the game controller 1000 when the acceleration threshold value was exceeded by the measured instant acceleration). Thus, in this embodiment, module 1024 disables the game controller for use by the first user corresponding to a first user ID based on the comparison of the instant acceleration and the acceleration threshold value. The delay period or lockout may be for an identified user or for all users. Additionally, in one embodiment, a plurality of lockout or delay periods may be defined wherein the value selected for lockout or disabling is based upon the user ID. For example, in one embodiment, a history of lockouts is stored for each established user. Accordingly, lockout values may be selected based upon the lockout history of a user.

Game controller 1000 is further configured to, while the game controller is locked out for the first user, receive user touch location information while a second user is holding a game controller, determine a second user ID for the second user based upon the user touch location information, enabled the game controller for use by the second user corresponding to the second user ID.

In one embodiment, game controller 1000 is configured to receive an unlock code and store the unlock code in memory 1012 to establish an unlock code for subsequent use to unlock a game controller whenever the game controller 1000 has been locked. Thus, game controller 1000 is configured to enable the disabled game controller for use upon entry of the unlock code. In an embodiment in which a game controller is locked in relation to a user ID, the game controller 1000 is configured to enabled the game controller for use by the first user upon entry of the unlock code.

In one embodiment of the invention, game controller 1000 is configured to receive user touch pad information to establish a master ID. Typically, the master ID is one that is established either the first time the controller is used or upon entry of a specified code or a mode selection to establish a master user having an associated master user ID. Subsequently, game controller 1000 is configured to receive user touch location information and to evaluate the touch information in relation to touch data stored in memory 1012 to the master user ID (i.e., to determine a master user is holding or touching the game controller). If the game controller is disabled or locked, the game controller is configured to unlock the game controller for use by the first user upon entry of an unlock command or code while the master user is holding the game controller.

In the above-described embodiments, game controller 1000 is configured disable the game controller based upon a determined instant acceleration in relation to an acceleration threshold value. The game controller may optionally be disabled only for the user holding (or most recently holding) the game controller when the acceleration threshold was exceeded or it may be locked for all users. In an alternative embodiment, game controller 1000 is configured to also evaluate at least one of a controller type, a controller ID or a game type or game ID.

In this embodiment, a plurality of acceleration threshold values are stored memory in relation to any one of controller ID, controller type, game ID or game type. For example, a game ID for a card game or an exercise program may have instant acceleration thresholds that are much lower than for a tennis or golf game where the controller 1000 can be expected to experience higher acceleration rates. As an additional aspect of the invention in one embodiment, a first user is locked out of a game only until the controller is unlocked based upon time or action by a master user. Thus, for example, if the first user exceeds an acceleration threshold value while a first game is being played, the first user is locked from playing the first game. The user may still use controller 1000 in relation to a different game (i.e., a second game). Alternatively, a game controller is locked for all users for the game until action by the master user. In yet another embodiment, the game controller is merely locked for all usage until unlocked (action is taken) by a master user. Such action includes the master user entering a master code to unlock the game controller.

In the above-described embodiments, the game controller 1000 further includes communication module 1028 to facilitate communications with game console 102. Such communications may be wired or wireless. Similarly, game console 102 includes communication module 1028 to facilitate communications with controller 1000. Additionally, game console 102 also includes a display processing module 1032 to generate display signals for a display device corresponding to application information received from controller 1000.

Figure 11:
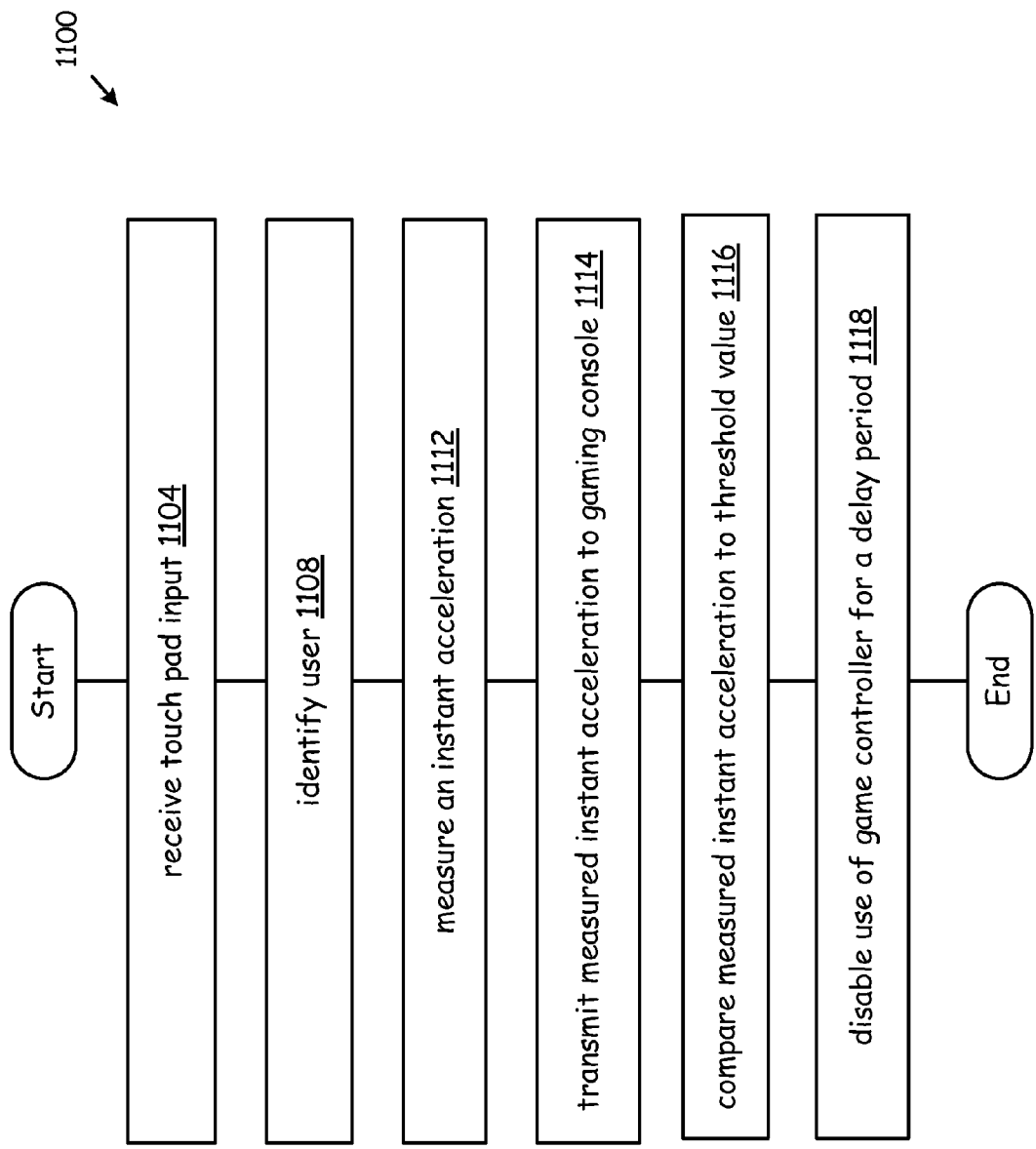
FIG. 11 is a flow chart illustrating a method according to one embodiment of the invention.

FIG. 11 is a flow chart illustrating a method according to one embodiment of the invention. Generally, FIG. 11 illustrates a method 100 for a video game system that includes receiving a touch pad input while a user is holding a controller, Step 1104. The touch pad input may comprise at least one of user touch location information while the user is holding a game controller or an entered user ID. The method further includes identifying a user, Step 1108. If the touch pad input comprises touch location information, identifying the user comprises identifying the user using pattern recognition techniques applied to the touch location information.

The method further includes measuring an instant acceleration of the game controller, Step 1112. Generally, the purpose of measuring instant acceleration is to determine, for example, that a game controller has been thrown or slammed against an object. Subsequently, the measured instant acceleration is transmitted to a game console for processing, Step 1114. Thereafter, the method includes comparing the instant acceleration to an (at least one) acceleration threshold value, Step 1116. In one embodiment, an acceleration threshold value is selected based upon an identity of the user. The acceleration threshold value may also be, for example, one that is selected based upon a game being played or even a type of controller. In at least one embodiment, the method includes disabling the controller when the acceleration threshold value is exceeded a specified number of times. In yet another embodiment, an acceleration threshold value is based upon a gaming point of a game being played. Thus, a game console selects acceleration threshold values based upon the gaming point. If the controller is performing the comparison, then the game console provides an indication of an appropriate threshold to the controller based upon the gaming point.

The method further includes disabling (locking) the game controller based upon determining that the acceleration threshold value was exceeded, Step 1118. This disabling or locking step may include, for example, disabling the game controller for use by the first user (only) based on the comparison of the instant acceleration and the acceleration threshold value. Moreover, in one embodiment of the invention, the delay is based upon the identity of the user or a user ID. For example, a history is kept of lockouts in relation to user ID. Accordingly, delay periods may be increased for a user based upon continued inappropriate behavior. Alternatively, the disabling function may be independent of the game or user ID. Stated differently, the disabling may occur without regard to game type or user ID.

In the described embodiment, the game controller is disabled in step 1118 for a delay period. Alternatively, the controller may be enabled (not disabled) for a different user, a different game, entry of a specified unlock code or action by a master user. The above describe method steps can include other aspects or variations. For example, the method may include, while the game controller is locked out, receiving a user touch pad input while a second user is holding a game controller, identifying a second user based upon the touch pad input, and unlocking the game controller for use by the second user.

One aspect of the embodiment includes receiving user touch location information corresponding to a master user, determining a master user ID, and unlocking the game controller for use by the user upon entry of the unlock code by the master user. Thus, if the controller is disabled, the controller is enabled (for the first user or for all users) once the master user generated a required touch pad input to unlock the controller such as entry of a code or depression of one or more buttons, to indicate that the controller should be unlocked.

As described above, disabling may be in relation to one user or for all users. In the case where the disabling occurs in relation to one user, the game controller is locked based upon the comparison between the instant acceleration and the threshold value in relation to a user ID in one embodiment. Moreover, acceleration threshold values may be user ID specific. The threshold values may also be based upon a controller ID or controller type or a game ID or game type (e.g., a game category).

Figure 12:
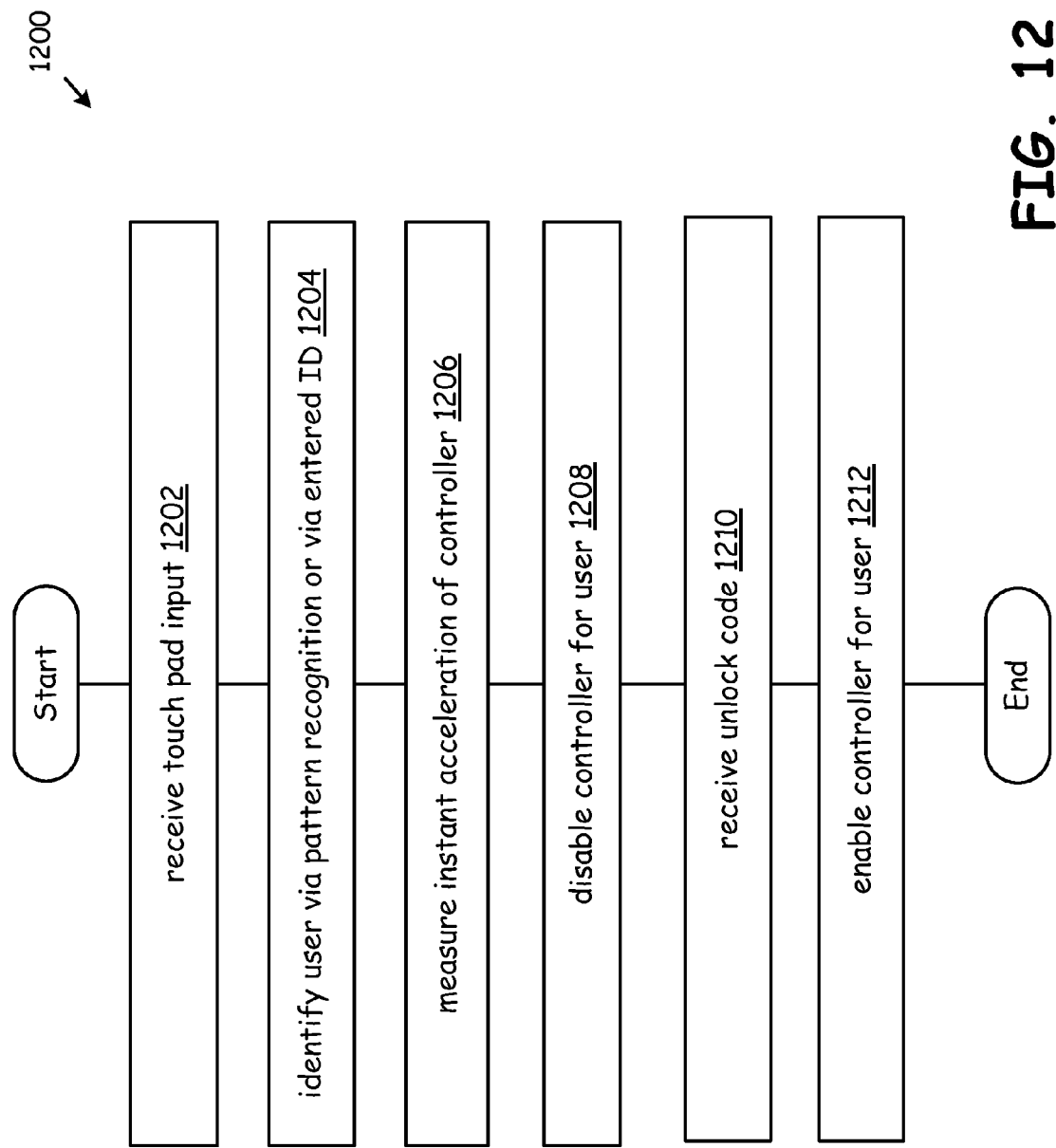
FIG. 12 is a flow chart that illustrates an alternative embodiment of a method for a video game system.

FIG. 12 is a flow chart that illustrates an alternative embodiment of a method for a video game system. The method of FIG. 12 shown generally at 1200 includes a controller receiving a touch pad input, Step 1202, and identifying the user holding the controller via pattern recognition or via an entered user ID, Step 1204. The touch pad input may be received from a touch pad that has a plurality of touch sensitive elements wherein the touch pad input corresponds to the user's touch of at least some of the plurality of touch sensitive elements. Pattern recognition techniques may be used by at least one of the controller and/or the game console to identify a user.

Thereafter, the method includes the controller measuring an instant acceleration of the controller, Step 1206. If the measured instant acceleration exceeds a specified acceleration threshold value, the method includes disabling the controller, Step 1208. In the described embodiment, the controller is disabled for the user identified in Step 1204. Alternatively, the controller is disabled for all users, for the game or application being used, or for the type of game or application being used.

Once the controller has been disabled for the user in the described embodiment, the method 1200 includes receiving an unlock code, Step 1210, and subsequently enabling the controller for use by the user for which it was disabled, Step 1212. Additionally, in one embodiment, the controller may be enabled after a specified delay if no unlock code is successfully entered.

FIG. 13 is a flow chart that illustrates a method for a game console of a video game system according to one embodiment of the invention. The game console is operable to receive an at least partially processed touch pad input from a game controller, Step 1304, and to compare the instant acceleration value to an acceleration threshold value, Step 1308. In one embodiment, processing circuitry of the game console is operable to select from a plurality of acceleration threshold values according to at least one of user ID, controller ID, controller type, and game ID or game type. In yet another embodiment, an acceleration threshold value is based upon a gaming point of a game being played. Thus, a game console selects acceleration threshold values based upon the gaming point.

Thereafter, the method includes the game console disabling use of the controller based upon the comparison of the instant acceleration value to an acceleration threshold value for a delay period, Step 1312. In an embodiment in which the controller is disabled in association with a user, and while the controller is disabled for use, the method includes the game console receiving the at least partially processed touch pad input while a second user is holding the game controller, Step 1316. This enables the game console to determine a second user is using the game controller based upon the at least partially processed touch pad input and to enable controller for second user, Step 1320. With respect to the first user, or in an embodiment in which the controller is disabled for all users, the embodiment of the invention further includes receiving an unlock code from the game controller and enabling the game controller for use, Step 1324. Each of the above listed steps for FIGS. 11-13 are supportable and may be performed by the controller or game console as described in relation to FIGS. 1-6 and 10.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output (s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating a gaming system, comprising:
determining an identity of a user of a game controller of the gaming system;
selecting an acceleration threshold value based on the identity of the user;
measuring an instant acceleration of the game controller of the gaming system;
comparing the instant acceleration to the acceleration threshold value;
disabling use of the game controller based on the comparison of the instant acceleration to the acceleration threshold value producing an unfavorable comparison; and
after elapse of a delay period corresponding to a specified amount of time, enabling use of the game controller.

2. The method of claim 1, further comprising selecting the delay period corresponding to the specified amount of time based upon the identity of the user.

3. The method of claim 1, further comprising:
receiving touch pad input from at least one touch sensitive pad of the game controller that has a plurality of touch sensitive elements, the touch pad input corresponding to a user's touch of at least some of the plurality of touch sensitive elements; and
processing the touch pad input to identify the user via pattern recognition.

4. The method of claim 1, further comprising transmitting the instant acceleration from the game controller to a game console of the gaming system for processing by the game console for disabling use of the game controller.

5. The method of claim 1, comprising:
receiving user input via a user interface;
comparing the user input to at least one unlock code; and
upon a favorable comparison, enabling use of the game controller.

6. The method of claim 1, further comprising disabling use of the game controller based upon a plurality of instant accelerations of the game controller exceeding the acceleration threshold value a specified number of times.

7. The method of claim 1, wherein the acceleration threshold value is selected based upon a game being played.

8. The method of claim 1 wherein the acceleration threshold value is selected based upon a gaming point of a game being played.

9. A game controller, comprising:
a communications interface that supports communications between the game controller and a game console;
an accelerometer module that determines an instant acceleration of the game controller; and
processing circuitry coupled to the communications interface and to the accelerometer module, the processing circuitry operable to:
determine an identity of a user of the game controller;
select an acceleration threshold value based on the identity of the user;
compare the instant acceleration to the acceleration threshold value;

disable use of the game controller when the comparison of the instant acceleration to the acceleration threshold value produces an unfavorable comparison; and after elapse of a delay period corresponding to a specified amount of time, enable use of the game controller.

10. The game controller of claim 9, wherein the processing circuitry is further operable to select the delay period corresponding to the specified amount of time based upon the identity of the user.

11. The game controller of claim 9 wherein the processing circuitry is further operable to:

receive touch pad input from at least one touch pad of the game controller; and process the touch pad input to determine the identity of the user of the game controller via pattern recognition.

12. The game controller of claim 9, wherein the processing circuitry is further operable to transmit the instant acceleration from the game controller to the came console for processing by the game console for disabling use of the game controller.

13. The game controller of claim 9, wherein the processing circuitry is operable to:

receive user input via a user interface;

compare the user input to at least one unlock code; and upon a favorable comparison, enable use of the game controller.

14. The game controller of claim 9, wherein the processing circuitry is operable to disable use of the game controller when a plurality of instant accelerations of the game controller exceed the acceleration threshold value a specified number of times.

15. The game controller of claim 9, wherein the processing circuitry is operable to select the acceleration threshold value based upon a game being played.

16. The game controller of claim 9 wherein the processing circuitry is operable to select the acceleration threshold value based upon a gaming point of a game being played.

17. A game console of a video game system, comprising:

a communications interface for communicating with a game controller; and processing circuitry coupled to the communications interface, the processing circuitry configured to:

determine an identity of a user of the game controller;

select an acceleration threshold value based upon the identity of the user;

receive an instant acceleration value from the game controller via the communications interface;

compare the instant acceleration value to the acceleration threshold value; and disable use of the game controller based upon the comparison of the instant acceleration value to the acceleration threshold value for a delay period corresponding to a specified amount of time.

18. The game console of claim 17, wherein the processing circuitry is operable to enable the game controller for use after elapse of the delay period corresponding to the specified amount of time.

19. The game console of claim 17, wherein the processing circuitry is operable to:

receive an unlock code from the game controller; and enable the game controller for use after receiving the unlock code.

20. The game console of claim 17, wherein the processing circuitry is operable to select from a plurality of acceleration threshold values according to at least one of user identification, a controller identification, a controller type, or a game being played.

* * * * *

UNITED STATES PATENT AND TRADEMARK OFFICE
CERTIFICATE OF CORRECTION

| | |
|---|---|
| PATENT NO. | : 8,535,133 B2 |
| APPLICATION NO. | : 12/894011 |
| DATED | : September 17, 2013 |
| INVENTOR(S) | : Qiang Fu |

Page 1 of 1

It is certified that error appears in the above-identified patent and that said Letters Patent is hereby corrected as shown below:

In the Claims

Col. 19, line 18, in claim 12: after "controller to" replace "came console" with --game console--

Signed and Sealed this
Thirtieth Day of September, 2014

Michelle K. Lee
*Deputy Director of the United States Patent and Trademark Office*